United States Patent
Zhao

(10) Patent No.: US 11,794,613 B2
(45) Date of Patent: Oct. 24, 2023

(54) GEARBOX QUICK CONNECTION FOR LONG RAIL ASSEMBLY

(71) Applicant: MAGNA SEATING INC., Aurora (CA)

(72) Inventor: Kai Zhao, Novi, MI (US)

(73) Assignee: Magna Seating Inc., Aurora (CA)

( * ) Notice: Subject to any disclaimer, the term of this patent is extended or adjusted under 35 U.S.C. 154(b) by 0 days.

(21) Appl. No.: 17/774,599

(22) PCT Filed: Nov. 6, 2020

(86) PCT No.: PCT/US2020/059274
§ 371 (c)(1),
(2) Date: May 5, 2022

(87) PCT Pub. No.: WO2021/092281
PCT Pub. Date: May 14, 2021

(65) Prior Publication Data
US 2022/0396179 A1    Dec. 15, 2022

Related U.S. Application Data

(60) Provisional application No. 62/931,302, filed on Nov. 6, 2019.

(51) Int. Cl.
*B60N 2/07*   (2006.01)
*B60N 2/02*   (2006.01)
*B60N 2/06*   (2006.01)

(52) U.S. Cl.
CPC ......... *B60N 2/0702* (2013.01); *B60N 2/0224* (2013.01); *B60N 2/067* (2013.01); *B60N 2/0722* (2013.01); *B60N 2002/0236* (2013.01)

(58) Field of Classification Search
CPC .... B60N 2/0702; B60N 2/0224; B60N 2/067; B60N 2/0722; B60N 2/005; B60N 2/01516; B60N 2/0705; B60N 2/0715; B60N 2/0732; B60N 2002/0236
USPC ....................................................... 297/344.1
See application file for complete search history.

(56) References Cited

U.S. PATENT DOCUMENTS

| | | | |
|---|---|---|---|
| 2006/0289717 A1* | 12/2006 | Ito ........................ | B60N 2/0232 248/419 |
| 2016/0114703 A1* | 4/2016 | Fujita ................... | B60N 2/0244 248/550 |
| 2018/0065507 A1* | 3/2018 | Napau ...................... | B60N 2/06 |
| 2018/0334054 A1* | 11/2018 | Higuchi ................... | B60N 2/06 |

(Continued)

FOREIGN PATENT DOCUMENTS

| | | |
|---|---|---|
| CN | 100482495 | 4/2009 |
| EP | 0359008 | 3/1990 |

*Primary Examiner* — Mark R Wendell
(74) *Attorney, Agent, or Firm* — Miller Canfield

(57) ABSTRACT

A long rail assembly for use in an automotive vehicle includes a fixed long rail, a rail drive assembly having a drive wheel for transposing the rail drive assembly along the fixed long rail, an upper gearbox attached to a vehicle seat, and an auto-centering quick connection mechanism for operatively coupling a guide pin extending from the upper gearbox to the drive wheel when the vehicle seat is attached to the rail drive assembly. The auto-centering quick connection mechanism further automatically rotates the guide pin to a home position when the vehicle seat is decoupled from the rail drive assembly.

17 Claims, 15 Drawing Sheets

(56) References Cited

U.S. PATENT DOCUMENTS

| | | |
|---|---|---|
| 2019/0168641 A1 | 6/2019 | Higuchi |
| 2019/0202322 A1* | 7/2019 | Napau ................ B60N 2/0715 |
| 2022/0048411 A1* | 2/2022 | Zhao .................. B60N 2/0881 |

* cited by examiner

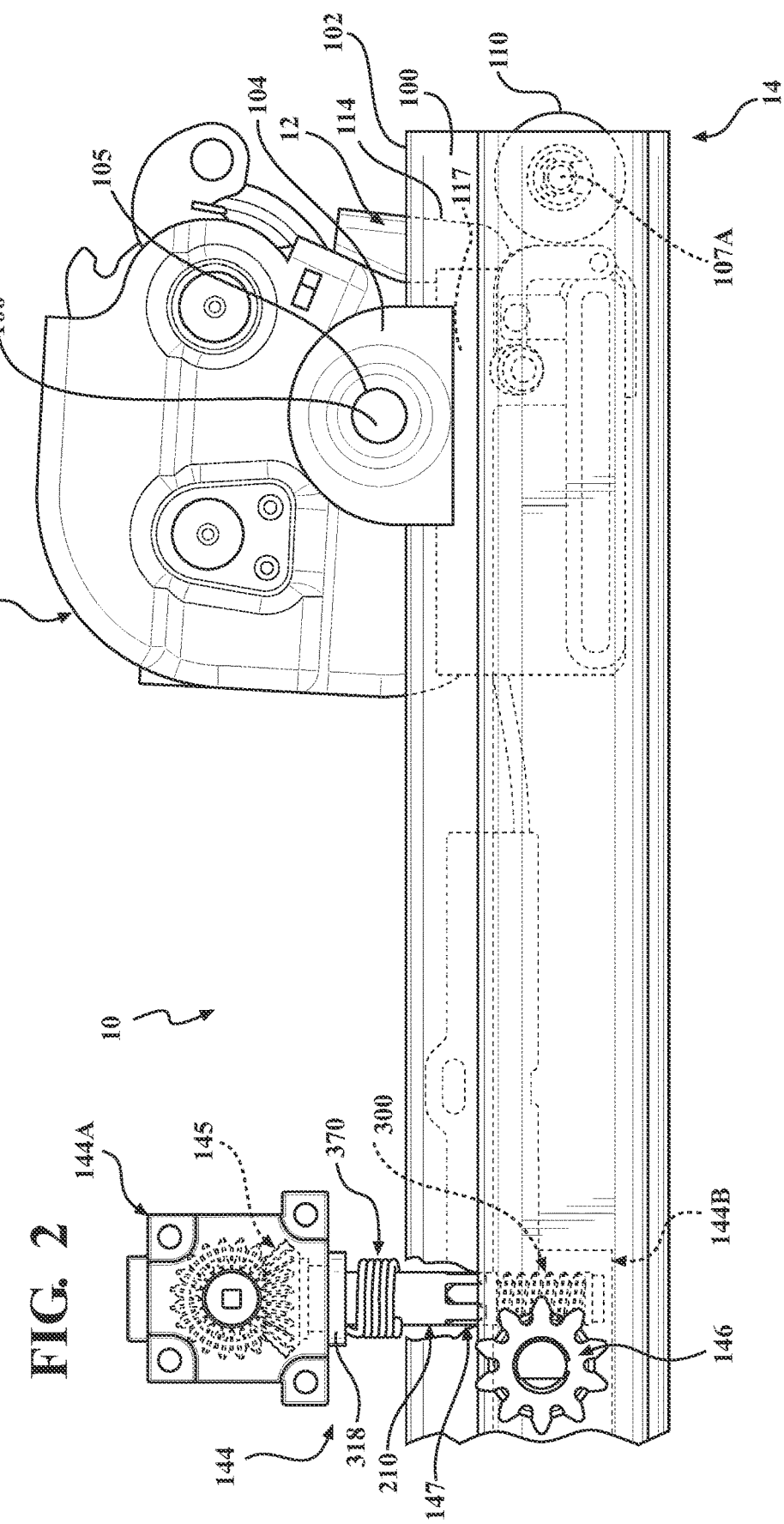

us 11,794,613 B2

GEARBOX QUICK CONNECTION FOR LONG RAIL ASSEMBLY

CROSS-REFERENCE TO RELATED APPLICATIONS

This application claims priority to and all the benefits of U.S. Provisional Application 62/931,302, filed Nov. 6, 2019, and entitled "Gearbox Quick Connection for Long Rail Assembly", the disclosure of which is hereby incorporated by reference in its entirety.

BACKGROUND OF THE INVENTION

1. Field of the Invention

The present invention relates to a long rail assembly wherein a seat with power adjustment capability is removably attached to a long rail assembly.

2. Description of Related Art

Multi-purpose, semi-autonomous, and fully autonomous vehicles are being introduced into the market. It is desirable to have a vehicle with an interior space that can be changed or reconfigured for various functions. For example, a consumer may want to remove a second and/or third row of seats to allow for more cargo space. In the future, with fully autonomous vehicles, a consumer may want to remove all of the seats creating a large, open, and multi-functional interior space. Thus, it is desirable to have a vehicle seat positioning system with power adjustment capabilities that still allows the vehicle seats to be removed and added as needed. Further, it is desirable to quickly connect the vehicle seat to the vehicle seat positioning system. Finally, it is desirable to incorporate a power source within the vehicle seat that is operatively coupled to a drive wheel in the vehicle seat positioning system requiring a flexible shaft connection between the power source and the drive wheel.

SUMMARY OF THE INVENTION

The present invention relates to a long rail assembly for providing sliding movement of a vehicle seat within a vehicle. A fixed long rail extends longitudinally between opposing first and second ends and defines an interior cavity therebetween. A rail drive assembly extends longitudinally between opposing first and second ends of the rail drive assembly and is slidably coupled to the fixed long rail for providing the sliding movement of the seat along the fixed long rail. A drive wheel is rotatably coupled within the interior cavity of the fixed long rail. An upper gearbox is adapted to be attached to the vehicle seat and configured to be operatively coupled to the drive wheel for automatically driving the rail drive assembly longitudinally along the fixed long rail. An auto-centering quick connection mechanism operatively couples the upper gearbox and the drive wheel when the vehicle seat is coupled with the rail drive assembly.

BRIEF DESCRIPTION OF THE DRAWINGS

Advantages of the present invention will be readily appreciated as the same becomes better understood by reference to the following detailed description when considered in connection with the accompanying drawings wherein:

FIG. 2 is a partially transparent side view of the long rail assembly of FIG. 1;

DETAILED DESCRIPTION OF THE EMBODIMENTS

FIGS. 1-5 illustrate a long rail assembly 10 having a power rail drive assembly 12 configured to provide sliding adjustment of a seat 18 in an automotive vehicle according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
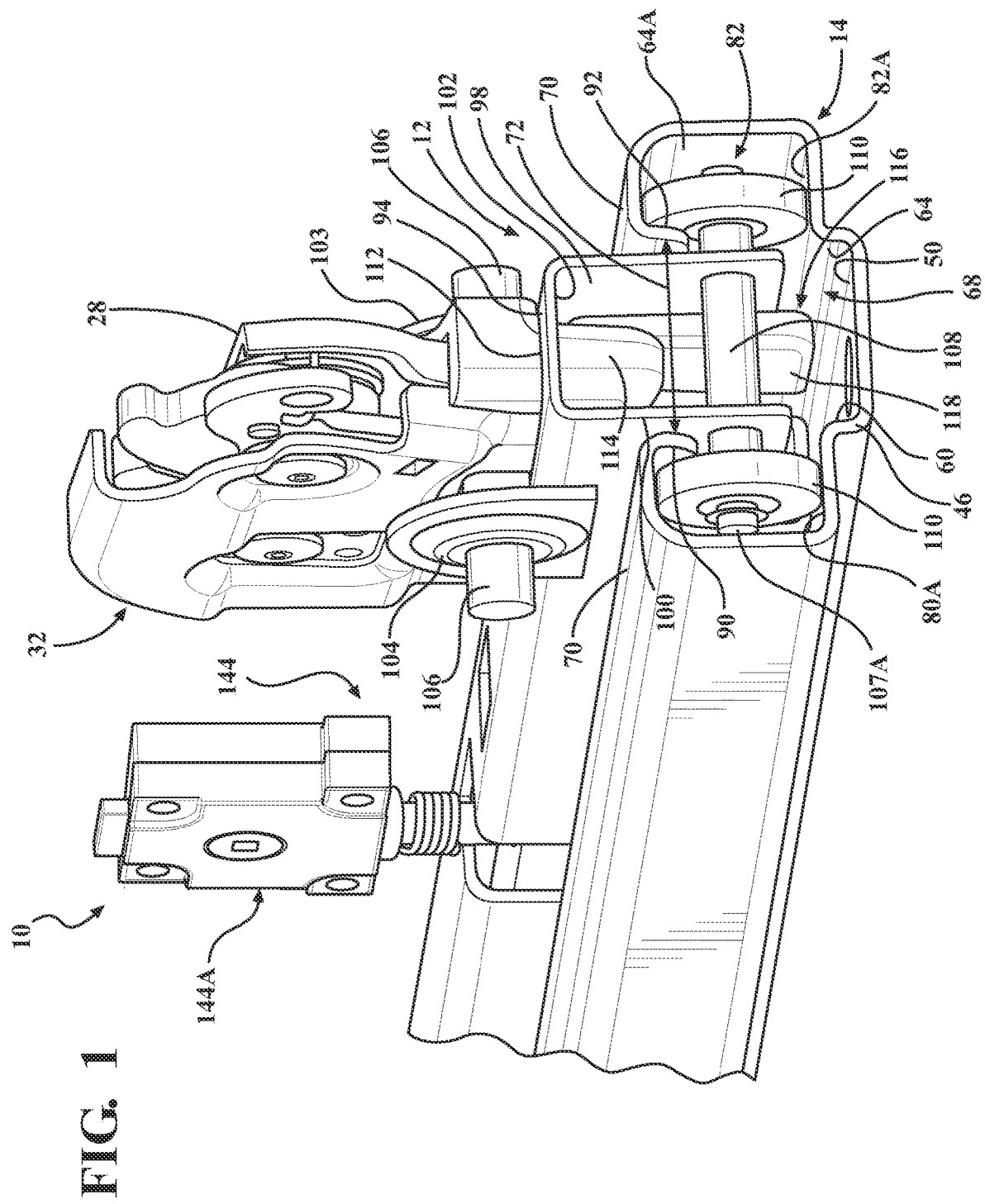
FIG. 1 is a fragmentary perspective view of a long rail assembly according to one embodiment of the invention.
Figure 3A:
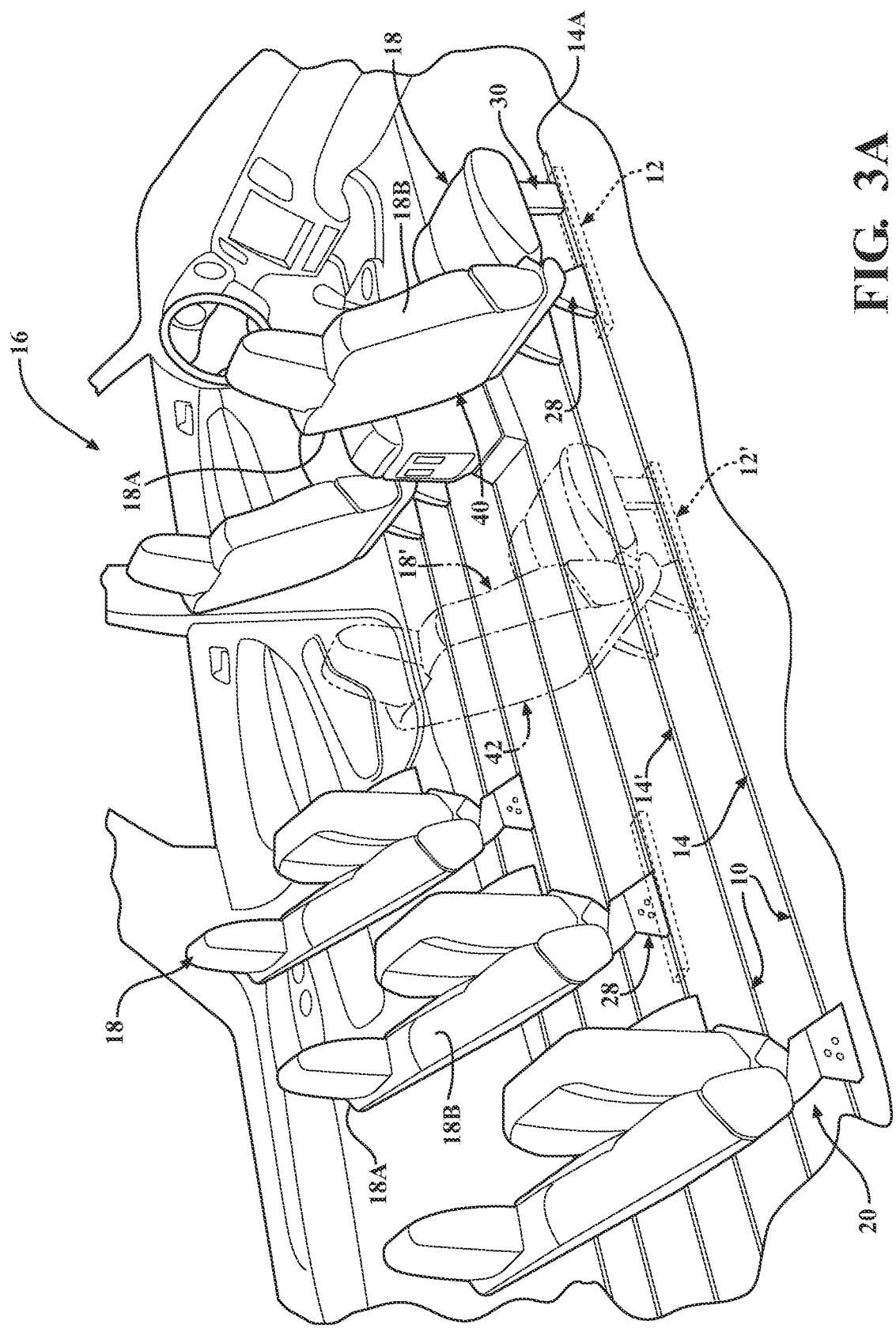
FIG. 3A is a fragmentary perspective view of a vehicle interior having vehicle seats coupled to the long rail assembly of FIG. 1, according to one embodiment of the present invention.
Figure 3B:
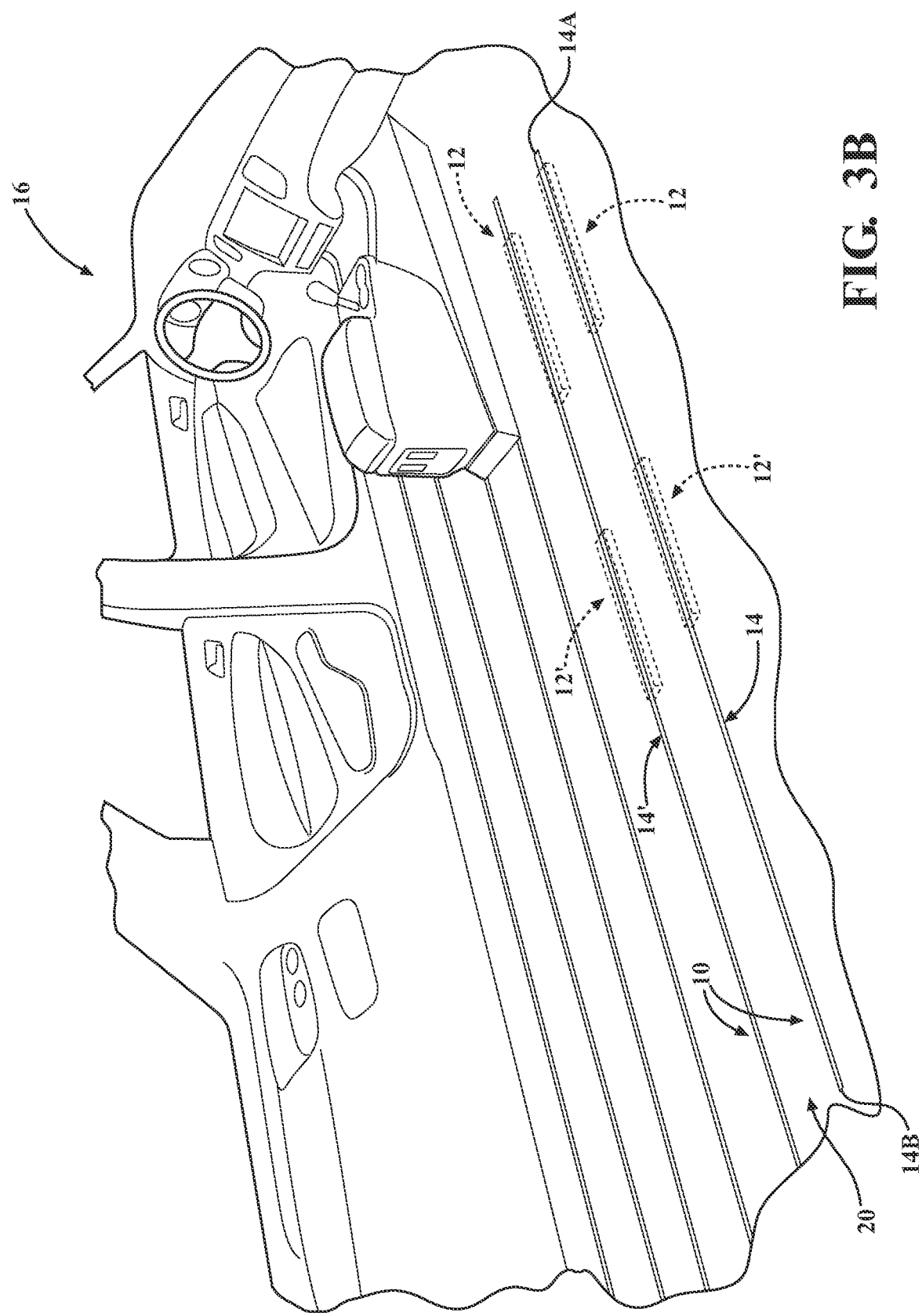
FIG. 3B is a fragmentary perspective view of the vehicle interior of FIG. 3A having the vehicle seats removed from the long rail assembly.
Figure 4:
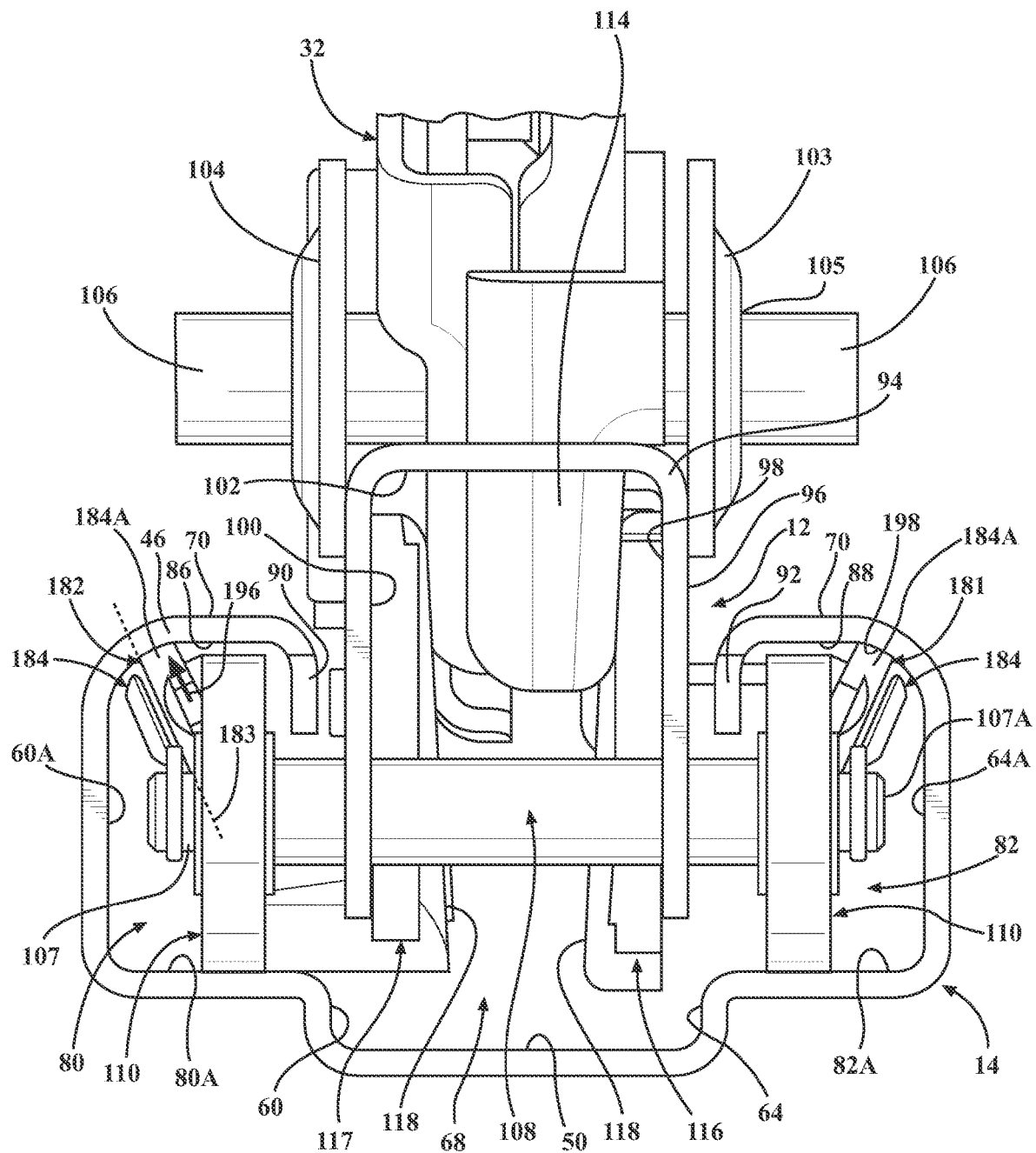
FIG. 4 is an end view of the long rail assembly of FIG. 1.
Figure 5:
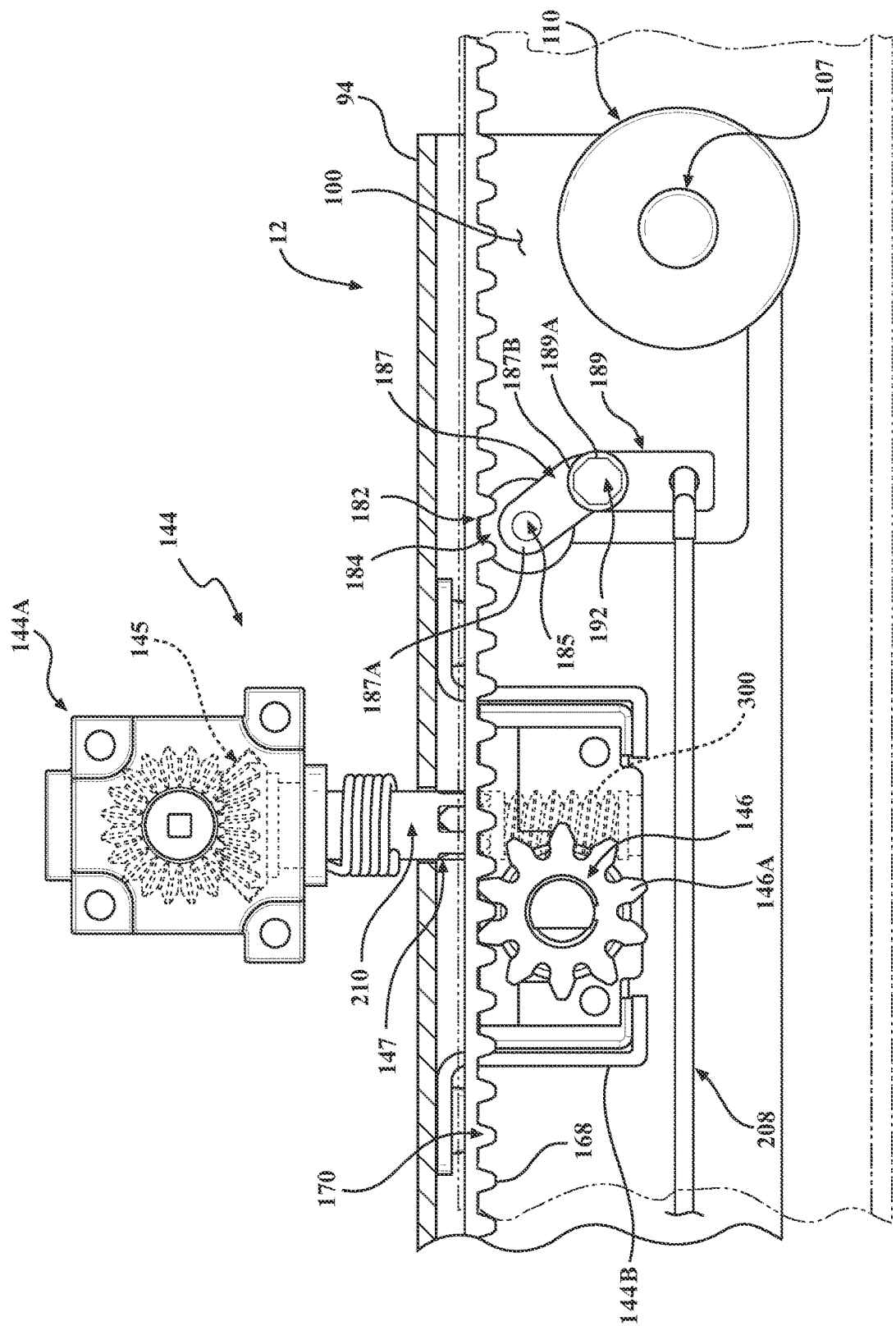
FIG. 5 is a cutaway side view of the portion of the long rail assembly of FIG. 1, illustrating a gearbox assembly according to one embodiment of the present invention.

FIGS. 1 and 2 illustrate a long rail assembly 10 having a power rail drive assembly 12 for adjusting the position of a vehicle seat 18 along a fixed long rail 14 according to one embodiment of the present invention. FIG. 3A shows an interior 16 of a vehicle having a plurality of vehicle seats 18 connected to the power rail drive assemblies 12 of the long rail assemblies 10. The fixed long rails 14 of the long rail assemblies 10 are attached to a vehicle floor 20. FIG. 3B shows the interior 16 of the vehicle of FIG. 3A wherein the vehicle seats 18 have been removed from the vehicle. An end view of the fixed long rail 14 and power rail drive assembly 12 of FIG. 1 is shown in FIG. 4. FIG. 5 shows a cutaway side view of the fixed long rail 14 and the power rail drive assembly 12 of FIGS. 1 and 2, according to one embodiment of the present invention.

Referring to FIGS. 3A and 3B, each vehicle seat 18 is supported by at least one leg 28 on opposing sides 18A, 18B of the vehicle seat 18, or optionally front and rear legs 30, 28 on the opposing sides 18A, 18B of the vehicle seat 18. At least one leg 28 is attached to a latch assembly 32 (See FIG. 1). The latch assembly 32 allows the vehicle seat 18 to be removably coupled to the power rail drive assembly 12. Each power rail drive assembly 12 travels along one of the fixed long rails 14 attached to the vehicle floor 20. Each fixed long rail 14 extends longitudinally between opposing first and second ends 14A, 14B of the fixed long rail 14 defining an interior cavity 68 therebetween. Each vehicle seat 18 travels along a pair of fixed long rails 14, 14' when the vehicle seat 18 is repositioned between a first seat location 40 and a second seat location 42, shown as seat 18' removably coupled to power rail drive assembly 12'. The fixed long rails 14 can extend for any length suitable for an intended application. Likewise, any suitable number of fixed long rails 14 can be positioned on the vehicle floor 20 as desired for an intended application. Thus, the long rail assembly 10 allows for improved vehicle seat 18 position adjustment since the vehicle seat 18 coupled to at least one power rail drive assembly 12 is repositionable to any seat position 40, 42 along the at least one fixed long rail 14. Furthermore, each vehicle seat 18 can be decoupled from the power rail drive assembly 12 allowing the number of vehicle seats 18 within the vehicle interior 16 to be adjusted or varied as desired.

Returning to FIGS. 1, 2, and 4, the fixed long rail 14 has a generally U-shaped cross-sectional profile 46 extending in a longitudinal direction, a bottom wall 50, opposing side walls 60, 64, an interior cavity 68, and a top wall 70 having an elongated opening 72 extending in a longitudinal direction. Each side wall 60, 64 of the fixed long rail 14 includes a track 80, 82 having a generally C-shaped cross-sectional profile with each track 80, 82 having a track bottom wall 80A, 82A, a track outer side wall 60A, 64A, a track top wall 86, 88, (see FIG. 4) and a retaining lip 90, 92 extending downward from the track top wall 86, 88 and spaced apart from the track outer side wall 60A, 64A. As illustrated in FIG. 4, each track bottom wall 80A, 82A is optionally positioned above the bottom wall 50 of the fixed long rail 14. The fixed long rail 14 is a stamped, formed, molded, and/or rolled section of a metal or plastic material and having a length selected based on a specific application. It should be appreciated that the size and shape of the fixed long rail 14 may vary without altering the scope of the invention.

Also shown in FIGS. 1, 2 and 4, the power rail drive assembly 12 includes a main body 94 having a generally inverted U-shaped cross-sectional profile 96, opposing first and second side walls 98, 100 and a top wall 102 extending between the opposing first and second side walls 98, 100. Fixedly attached to the opposing first and second side walls 98, 100 are a first and second striker plate 103, 104. Each striker plate 103, 104 is a solid piece of metal but for a central opening 105. A striker 106 passes through the central opening 105 in each of the first and second striker plates 103, 104. The striker 106 is fixedly attached to the first and second striker plates 103, 104 to allow for a sturdy connection.

In order to allow for smooth movement of the vehicle seat 18 when latched, an axle 107 extends laterally through a hollow tube 108 extending between the opposing side walls 98, 100, as illustrated in FIG. 4. A wheel 110 is fixedly coupled to each end 107A of the axle 107. While not shown, the wheels 110 can be replaced by rollers and/or glides. Any number and/or combination of wheels 110, rollers, and/or glides may be used as suitable for an intended application. Further, each wheel 110 or roller can be rotationally attached to the main body 94 using a shaft (not shown) fixedly coupled to one of the opposing side walls 98, 100 of the main body 94.

The latch assembly 32 can be removably latched to the striker 106. The connection and disconnection of the latch assembly 32 with the striker 106 allows the vehicle seat 18 to be attached to or removed from the power rail drive assembly 12. Further included is an opening 112 in the top wall 102 of the power rail drive assembly 12 (shown in FIG. 1). An extension 114 of the latch assembly 32 descends into the opening 112 of the power rail drive assembly 12 when the latch assembly 32 is being latched to the striker 106. As the extension 114 passes through the opening 112, it comes into contact with first and second wedge plates 116, 117. The wedge plates 116, 117 are each attached to their respective opposing first and second side walls 98, 100 of the main body 94. Each wedge plate 116, 117 has an angled or tapered surface 118 which means the space between the first and second wedge plates 116, 117 decreases as the extension 114 of the latch assembly 32 descends through the opening 112 in the top wall 102 of the power rail drive assembly 12. The angled surfaces 118 help guide and center the latch assembly 32 into position through contact with the extension 114. The angled surfaces 118 also create a snug and secure fit with the extension 114 once the latch assembly 32 is fully latched to the striker 106.

As also shown in FIGS. 1 and 2, the power rail drive assembly 12 includes a gearbox assembly 144 which comprises an upper gearbox 144A fixedly coupled to the vehicle seat 18 and a lower gearbox 144B fixedly coupled to the power rail drive assembly 12. The upper gearbox 144A is located within the vehicle seat 18 and includes a drive gear 145. The lower gearbox 144B is located within the power rail drive assembly 12. A drive wheel 146 is operatively coupled to the lower gearbox 144B and is located within the fixed long rail 14. The drive gear 145 is operatively coupled to a drive wheel 146 through an auto-centering quick connection mechanism 147. The auto-centering quick connection mechanism 147 operatively couples the upper gearbox 144A to the lower gearbox 144B. The auto-centering quick connection mechanism 147 is located between the drive gear 145 and the drive wheel 146 such that the upper gearbox 144A operatively engages with the drive wheel 146 when the vehicle seat 18 is coupled to the power rail drive assembly 12, as will be described in more detail below. While the drive gear 145 and drive wheel 146 are respectively shown as a bevel gear and spur gear in the embodiment of FIG. 2, other embodiments of the upper gearbox 144A and lower gearbox 144B can include other types of gears including lateral drive wheels, spiral gears, herringbone gears, flexible shafts, worm gears, and the like, without altering the scope of the invention.

Referring to FIG. 5, the drive wheel 146 is a plastic gear having a plurality of gear teeth 146A. The gear teeth 146A of the drive wheel 146 meshingly engage with gear teeth 168 and/or notches 168 in a gear rack 170 fixedly coupled to the fixed long rail 14. The drive wheel 146 is not a load-carrying component. While the drive wheel 146 can comprise other materials as desired for an intended application, the plastic drive wheel 146 provides a quiet driving method as the power rail drive assembly 12 travels along the fixed long rail 14. Further, the gear teeth 168 on the gear rack 170 prevent driving slip when the gear teeth 168 meshingly engage with the gear teeth 146A on the drive wheel 146.

As shown in FIGS. 4 and 5, a pair of stability rolling elements 181, 182 are rotationally coupled to each opposing side wall 98, 100 of the main body 94. FIG. 4 is an end view taken of FIG. 1 showing the stability rolling elements 181, 182 being mounted at an angle 183 to the opposing side walls 98, 100 of the main body 94. FIG. 5 shows a cutaway side view of the main body 94 of the power rail drive assembly 12, the wheels 110, and stability rolling elements 181, 182. While the stability rolling elements 181, 182 can be mounted at any suitable angle 183 to the opposing side walls 98, 100 of the main body 94, in the embodiment shown in FIG. 4 the stability rolling elements 181, 182 are mounted at about a 30 degree angle 183 to the respective opposing side wall 98, 100. Each stability rolling element 181, 182 includes a roller 184, an upper arm 187, a lower arm 189, and a support stud 192. Referring to FIG. 5, the roller 184 is rotationally coupled to pivot 185 near an upper end 187A of the upper arm 187. A lower end 187B of the upper arm 187 is rotationally coupled to the support stud 192. The support stud 192 is fixedly coupled to an adjacent opposing side walls 98, 100 at a mounting angle 183, such as about 30 degrees as shown in FIG. 4. Alternatively, the support stud 192 can extend generally perpendicular from the opposing side walls 98, 100 of the main body 94. Thus, the support stud 192, upper arms 187, and lower arms 189 can be orientated at any suitable angle with respect to the opposing side walls 98, 100 of the main body 94 suitable for a specific application without altering the scope of the invention.

Also shown in FIG. 5, an upper end 189A of the lower arm 189 is rotationally coupled to the support stud 192. The lower end 187B of the upper arm 187 is fixedly coupled to the upper end 189A of the lower arm 189 so they are linked together to move as one arm. Alternatively, the upper arm 187 and the lower arm 189 can be replaced by a single arm if desired.

The rollers 184, shown in the embodiment of FIGS. 4 and 5, are mounted at an angle 183 of about 30 degrees to the adjacent opposing side walls 98, 100 of the main body 94. Further, a large corner radius 196, i.e. a curved surface, extends between the track top walls 86, 88 and the track outer side walls 60A, 64A of the fixed long rail 14, as shown in FIG. 4. The large corner radius 196 reduces the amount of noise caused by the roller 184 rotating around its axis. It should be appreciated that the angular relationship between the roller 184 and the attached upper arm 187 with respect to the adjacent opposing side walls 98, 100 of the main body 94, as well as the corner radius 196, can vary without altering the scope of the invention. In the embodiment shown in FIG. 4, the angle 183 and the corner radius 196 are selected such that a rolling surface 184A of the roller 184 generally frictionally engages with a curved portion 198 extending between the track outer side walls 60A, 64A and the track top walls 86, 88 of the fixed long rail 14. The roller 184 absorbs fixed long rail 14 variations in both a lateral and a vertical direction since the roller 184 is angled at about 30 degrees from the opposing side walls 98, 100 of the main body 94.

Referring to FIG. 5, each pair of stability rolling elements 181, 182 are coupled together through a tension spring 208.

Further description of the sliding movement between the power drive rail assembly 12 and the fixed long rail 14 is fully set forth in Applicant's co-pending application no. PCT/US2019/055835, entitled Long Rail Assembly for Vehicle Seat Adjustment, filed Oct. 11, 2019, the disclosure of which is hereby incorporated by reference in its entirety.

Referring to FIGS. 1, 2 and 5, the gearbox assembly 144 of the long rail assembly 10 provides the torque needed for rotation of the drive wheel 146. The torque is transferred from the drive gear 145 of the upper gearbox 144A to the drive wheel 146 of the lower gearbox 144B through the auto-centering quick connection mechanism 147. The structure of the auto-centering quick connection mechanism 147 may vary between different embodiments of the long rail assembly 10 without altering the scope of the invention.

Figure 6:
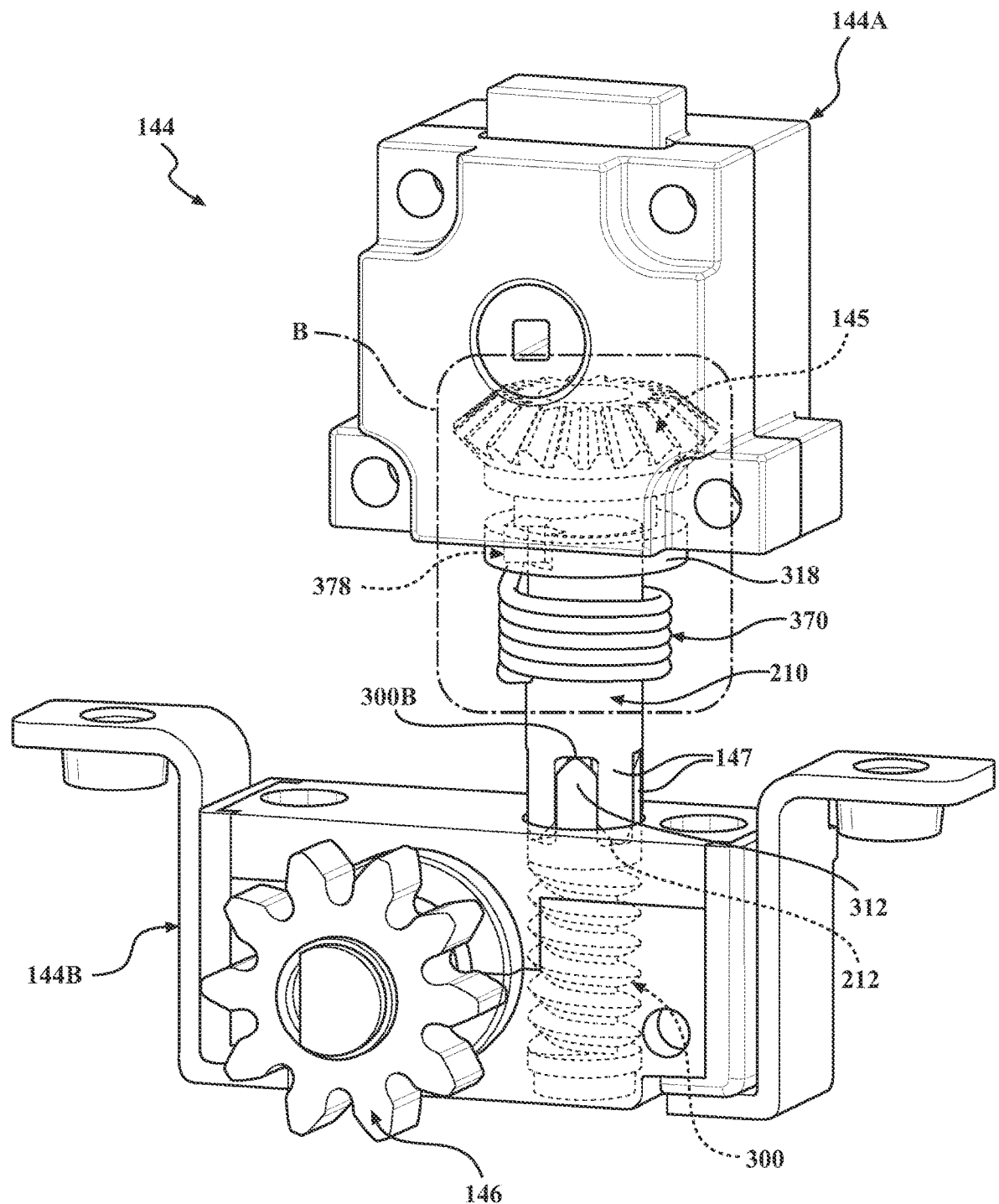
FIG. 6 is a perspective view of the gearbox assembly of FIG. 5 removed from the long rail assembly, illustrating a guide pin projecting from an upper gearbox coupled to a worm projecting from a lower gearbox.
Figure 7:
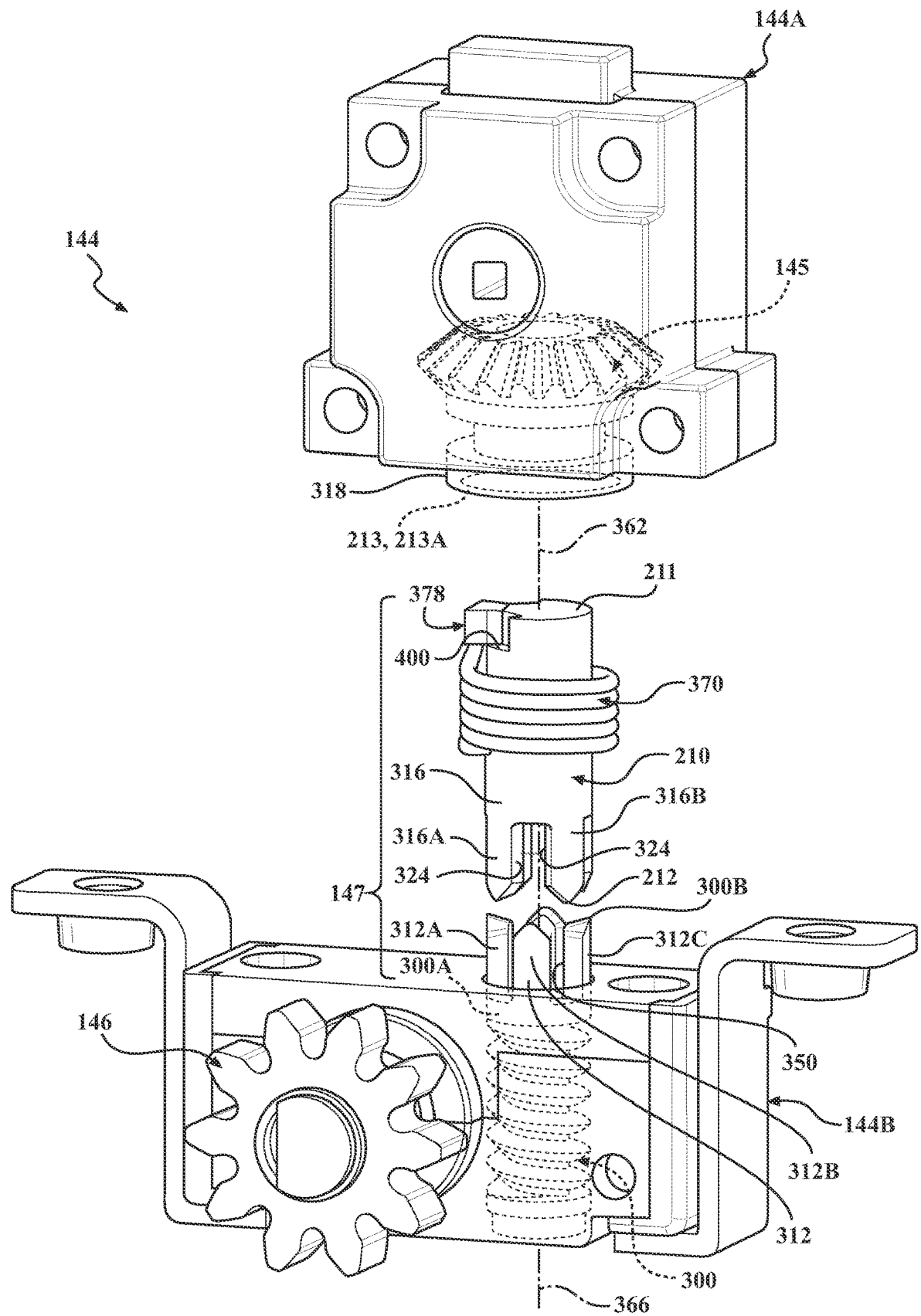
FIG. 7 is a partially exploded view of the gearbox assembly of FIG. 6.

An illustration of the gearbox assembly 144 removed from the long rail assembly 10 is shown in FIG. 6. A partially exploded view of the gearbox assembly 144 is shown in FIG. 7, illustrating details of the auto-centering quick connection mechanism 147. The auto-centering quick connection mechanism 147 is a coupling interface that replaces a traditional flex shaft connection into the lower gearbox 144B. The self-alignment design for the coupling interface assures a full engagement between a guide pin 210 extending from the upper gearbox 144A and a worm 300 in the lower gearbox 144B. The upper gearbox 144A couples the drive gear 145 to a motor (not shown) within the vehicle seat 18. The auto-centering quick connection mechanism 147 eliminates a manual alignment process with the traditional flex shaft connection, which is more efficient for applications that require frequent quick connections during the lifecycle of the gearbox assembly 144.

In the embodiment shown in FIGS. 5 through 10, the drive wheel 146 is operatively coupled to the worm 300 within the lower gearbox 144B. As shown in FIG. 7, the upper gearbox 144A includes the guide pin 210 that helps center the upper gearbox 144A with the worm 300 when the vehicle seat 18 is being coupled and latched to the power rail drive assembly 12. The guide pin 210 extends from a proximal end 211 received in a central bore 213 of the drive gear 145 to an opposite distal end 212. A face spline 312 extending from one end 300A of the worm 300 is configured to matingly engage with a meshing spline 316 at the distal end 212 of the guide pin 210. The drive gear 145 includes a collar 318 extending circumferentially around an outer periphery 213A of the central bore 213, as shown in FIG. 7. The collar 318 is integrally formed with the drive gear 145. Alternatively, in some embodiments the collar 318 can be formed as a separate piece and assembled with the drive gear 145.

Figure 8:
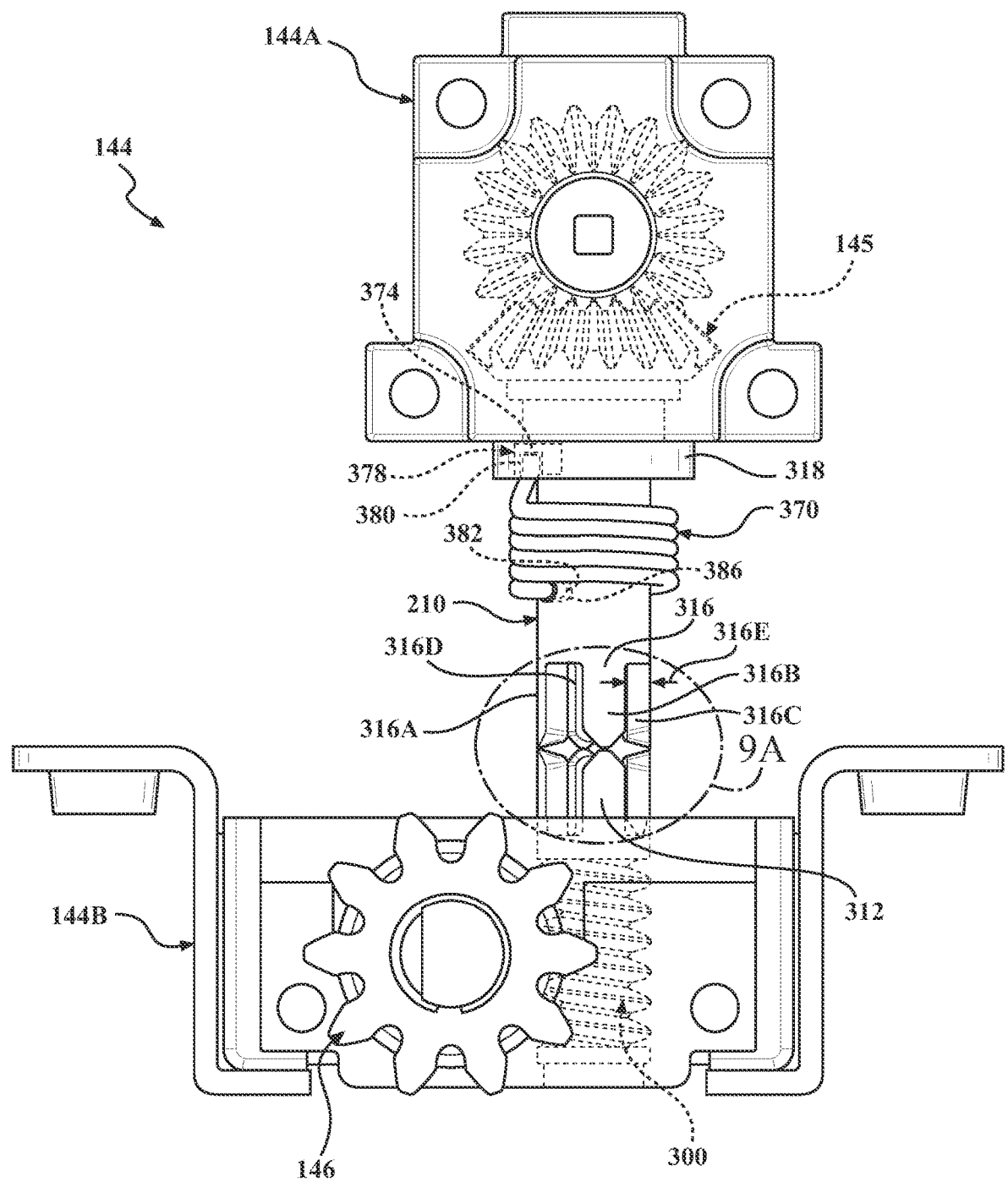
FIG. 8 is a side view of the gearbox assembly of FIG. 5, illustrating the guide pin spaced apart from the worm.
Figure 9A:
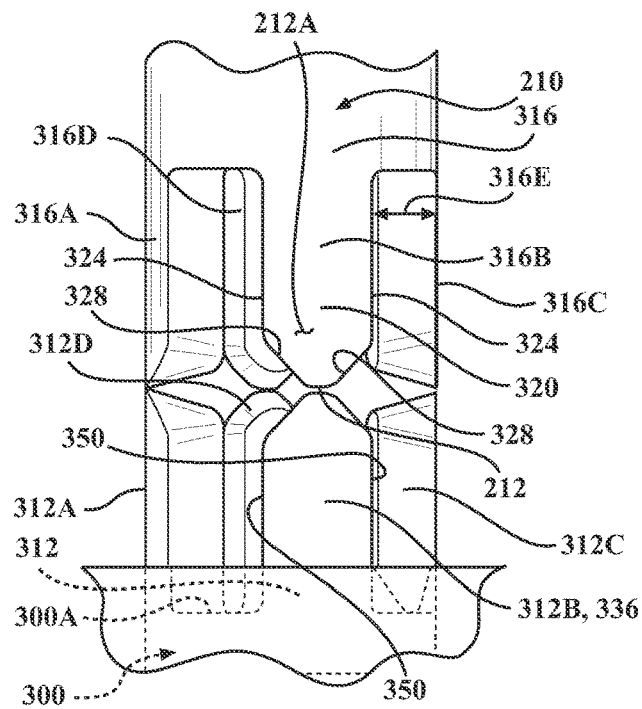
FIG. 9A is an enlarged view of portion 9A of FIG. 8, illustrating a meshing spline of the guide pin spaced apart from a face spline of the worm.
Figure 9B:
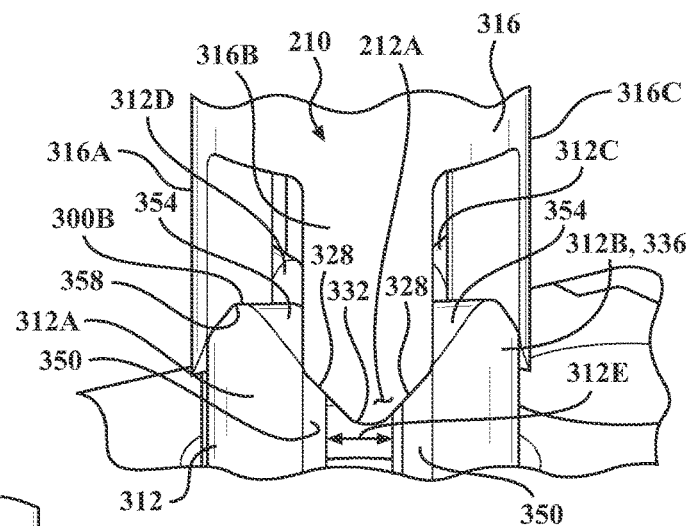
FIG. 9B is an enlarged view of portion 9A of FIG. 8, illustrating the meshing spline of the guide pin partially engaged with the face spline of the worm.

FIG. 8 shows the meshing spline 316 on the guide pin 210 being spaced apart from the face spline 312 on the worm 300. In the embodiment shown in FIG. 8, the meshing spline 316 comprises a first plurality of spaced apart legs 316A-316D with a gap 316E between each pair of adjacent legs 316A-316D. While four legs 316A-316D are shown in the embodiment of FIG. 8, the number of legs of the first plurality of spaced apart legs 316A-316D can vary in different embodiments without altering the scope of the invention. An enlarged view of portion 9A of FIG. 8 is shown in FIG. 9A, illustrating further details of the meshing spline 316 and the face spline 312. Referring to FIG. 9A, each spaced apart leg 316A-316D comprises an elongated main leg 320 having opposing side portions 324 and opposing beveled portions 328 extending between the opposing side portions 324 and the distal end 212 of the respective leg 316A-316D. The distal ends 212 of the spaced apart legs 316A-316D define the distal end 212 of the guide pin 210. As shown in FIG. 9B, a curved surface 332 joins the opposing beveled portions 328 to allow for smooth engagement with the face spline 312 on the worm 300. The opposing beveled portions 328 and the curved surface 332 joining the opposing beveled portions 328 define a tip portion 212A of the respective leg 316A-316D.

Figure 9C:
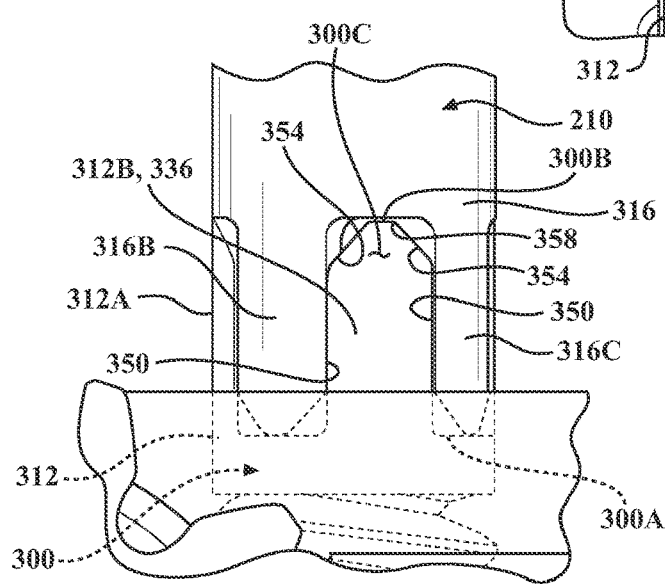
FIG. 9C is an enlarged view of portion 9A of FIG. 8, illustrating the meshing spline of the guide pin matingly engaged with the face spline of the worm.

FIG. 9A shows the meshing spline 316 spaced apart from the face spline 312. FIGS. 9B and 9C show the meshing spline 316 and the face spline 312 partially engaged and fully engaged, respectively. Referring to FIG. 9B, the face spline 312 of the worm 300 is configured to matingly engage with the meshing spline 316 of the guide pin 210. The face spline 312 comprises a second plurality of spaced apart legs 312A-312D with a gap 312E between each pair of adjacent legs 312A-312D. While four legs 312A-312D are shown in the embodiment of FIG. 9B, the number of legs of the second plurality of spaced apart legs 312A-312D can vary in different embodiments without altering the scope of the invention.

Referring to FIG. 9C, each spaced apart leg 312A-312D comprises an elongated main leg 336 having opposing side portions 350 and opposing beveled portions 354 extending between the opposing side portions 350 and the distal end 300B of the respective leg 312A-312D. The distal ends 300B of the spaced apart legs 312A-312D define the distal end 300B of the worm 300. As shown in FIG. 9C, a curved surface 358 joins the opposing beveled portions 354 to allow for smooth engagement with the meshing spline 316 on the guide pin 210. The opposing beveled portions 354 and the curved surface 358 joining the opposing beveled portions 354 define a tip portion 300C of the respective leg 312A-312D.

The meshing spline 316 and the face spline 312 are configured to meshingly engage. As illustrated in FIG. 7, the opposing side portions 324 of the spaced apart legs 316A-316D of the meshing spline 316 are tapered towards the longitudinal axis 362 of the guide pin 210. Likewise, the opposing side portions 350 of the spaced apart legs 312A-312D of the face spline 312 are also tapered towards the longitudinal axis 366 of the worm 300. When the face spline 312 and the meshing spline 316 are fully engaged (as shown in FIG. 10), the longitudinal axis 362 of the guide pin 210 is aligned with the longitudinal axis 366 of the worm 300.

As illustrated in FIG. 8, a torsion spring 370 is wrapped around the guide pin 210 with an upper end 374 of the torsion spring 370 fixedly coupled to a key 378. The upper end 374 of the torsion spring 370 is inserted into a hole 380 in the key 378. The torsion spring 370 has a lower end 382 fixedly coupled to the guide pin 210, as shown in FIG. 8. In the embodiment shown in FIG. 8, the lower end 382 of the torsion spring 370 is inserted into a hole 386 in the guide pin 210. It will be appreciated that alternate methods of attaching the lower end 382 of the torsion spring 370 to the guide pin 210, such as crimping, welding, a mechanical fastener, and the like, can be used without altering the scope of the invention. Likewise, alternate methods of attaching the upper end 374 to the key 378, such as crimping, welding, a mechanical fastener, and the like, can be used in certain applications without altering the scope of the invention.

Figure 10:
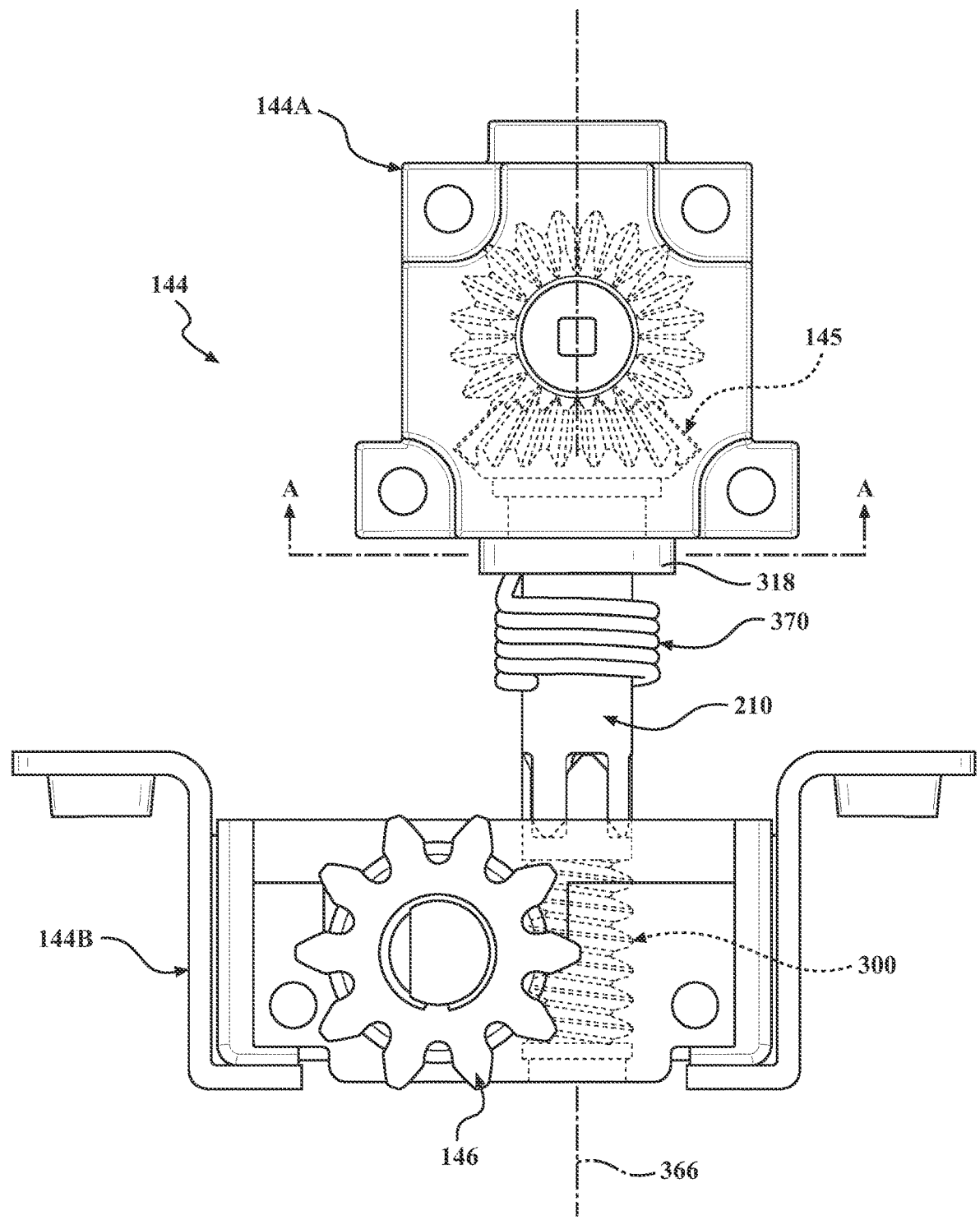
FIG. 10 is a side view of the gearbox assembly of FIG. 8, illustrating the meshing spline of the guide pin matingly engaged with the face spline of the worm.
Figure 11:
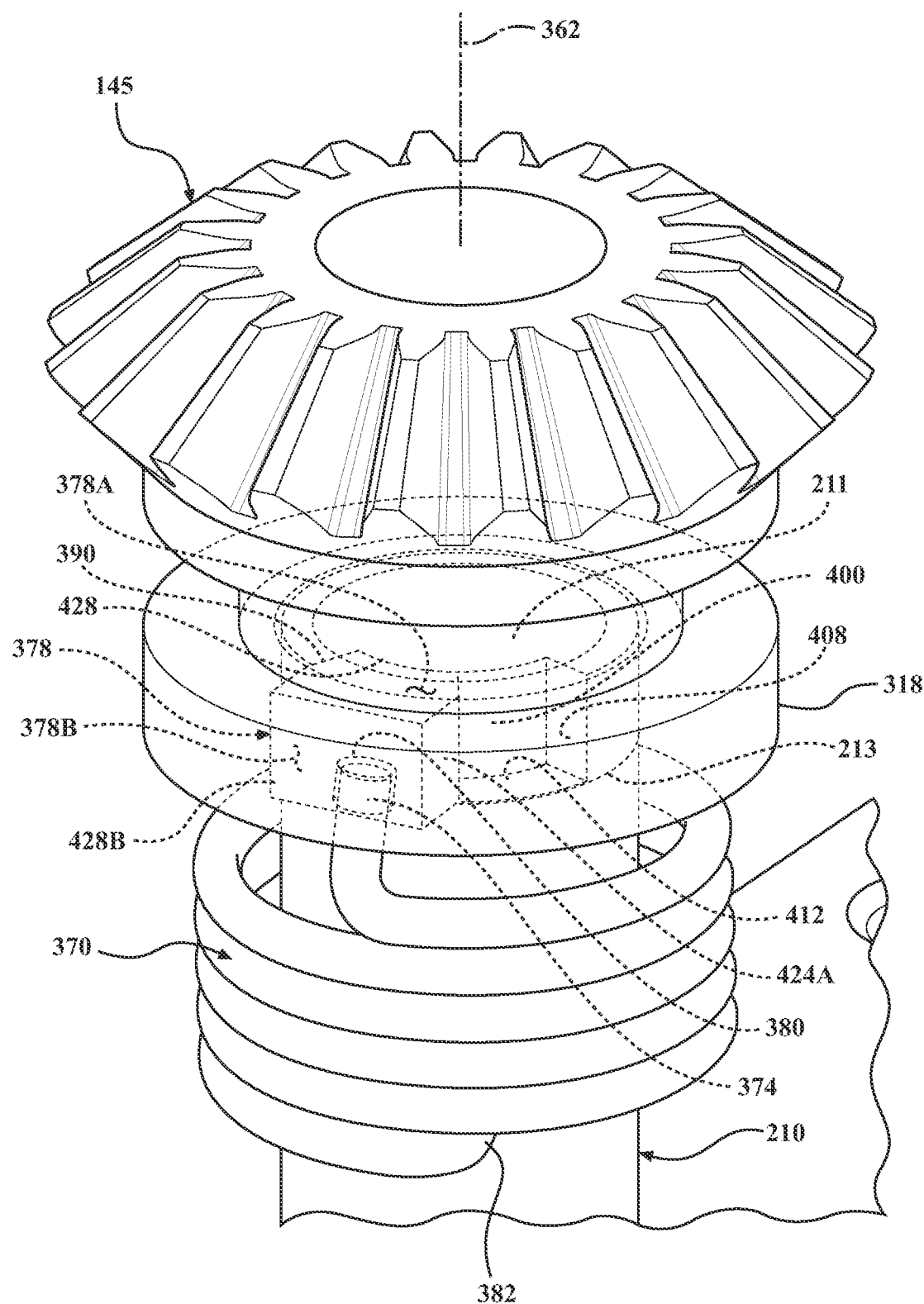
FIG. 11 is an enlarged perspective view of portion B of FIG. 6, illustrating the guide pin assembled with a drive gear, a key, and a torsional spring showing the key in a home position with respect to a slot in the guide pin.
Figure 12:
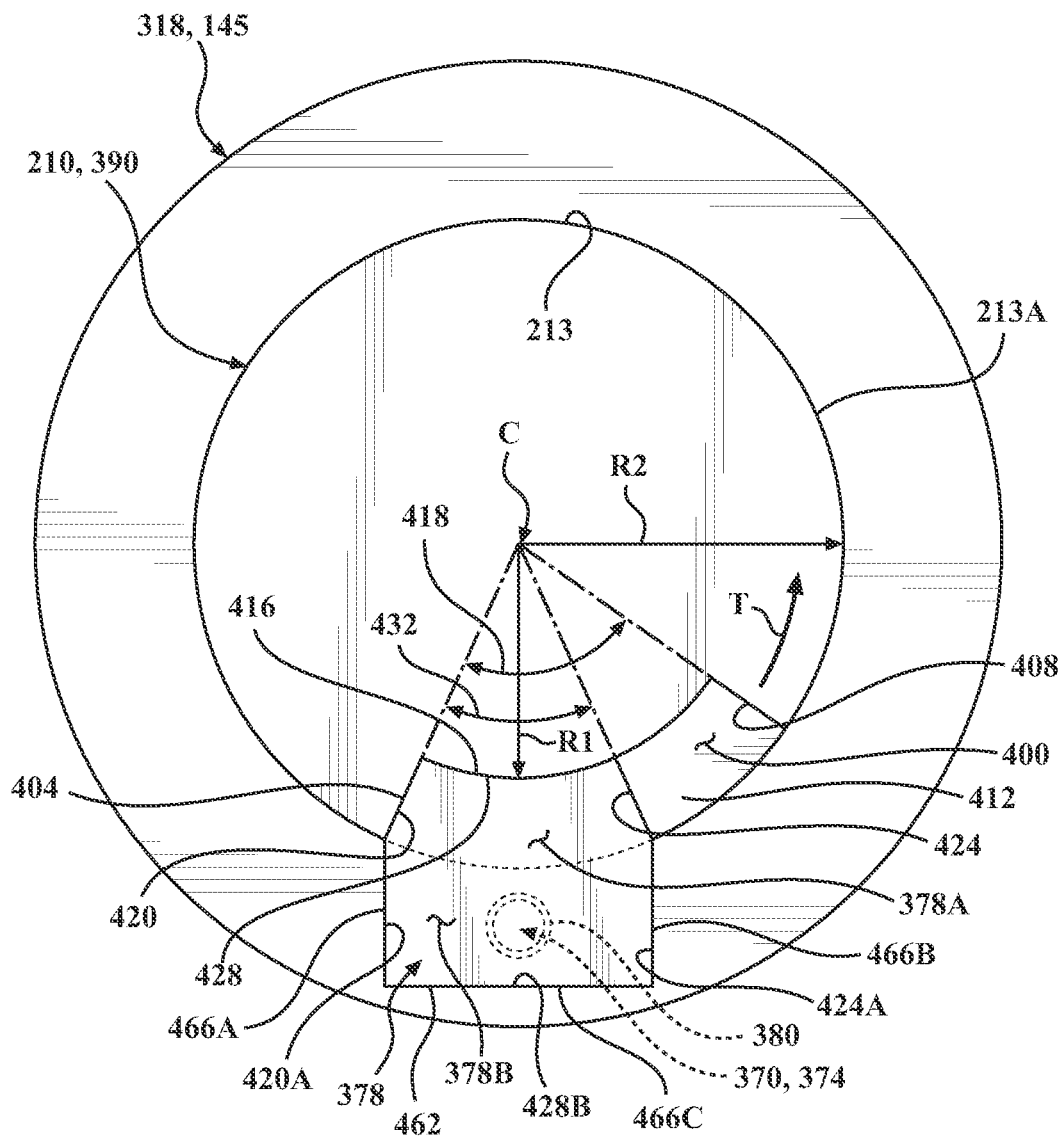
FIG. 12 is a cross-sectional end view taken along section line A-A of FIG. 10, illustrating the key and the guide pin in the home position.
Figure 13:
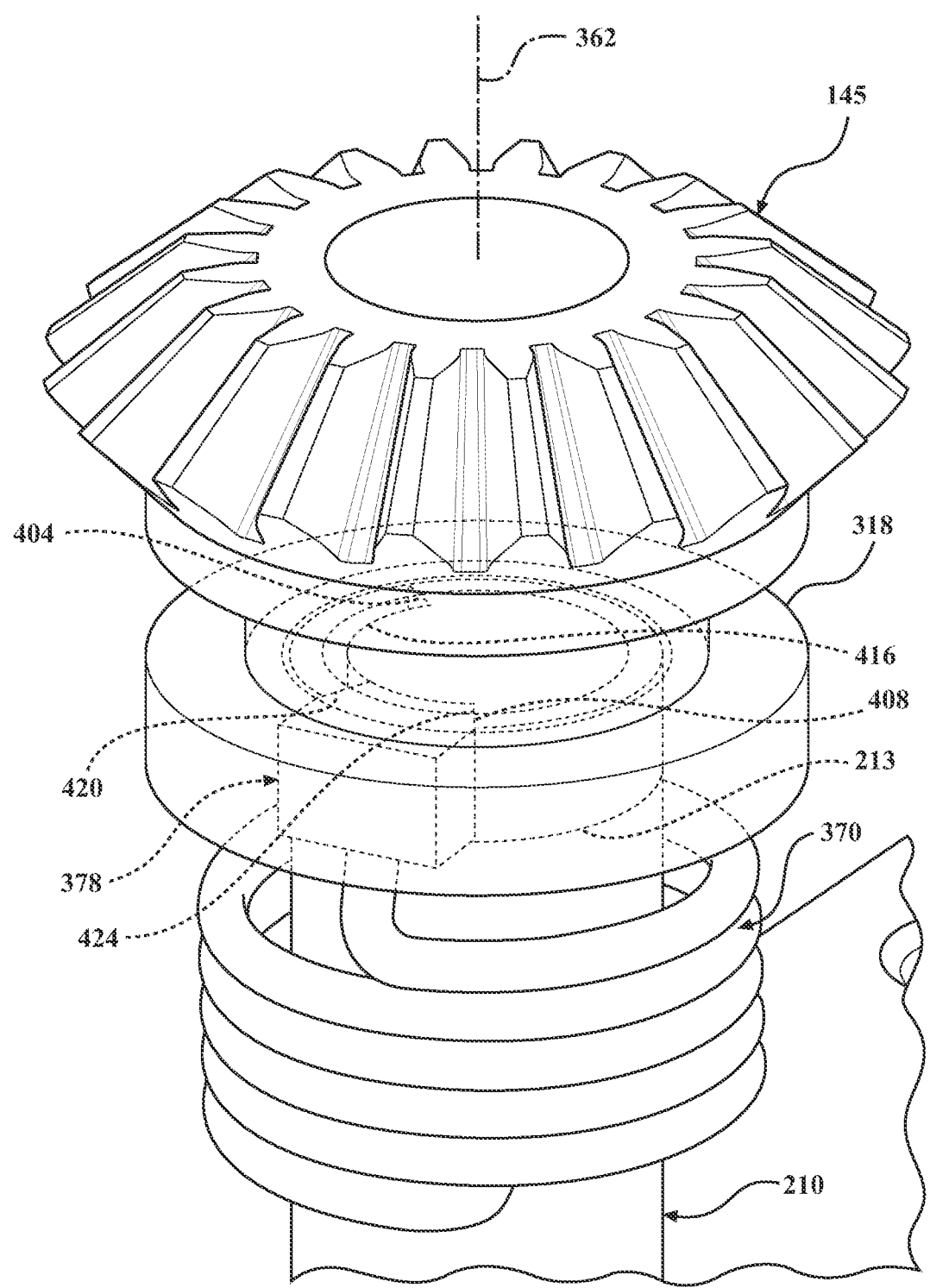
FIG. 13 shows the guide pin and key of FIG. 11 rotated away from the home position shown in FIG. 11.
Figure 14:
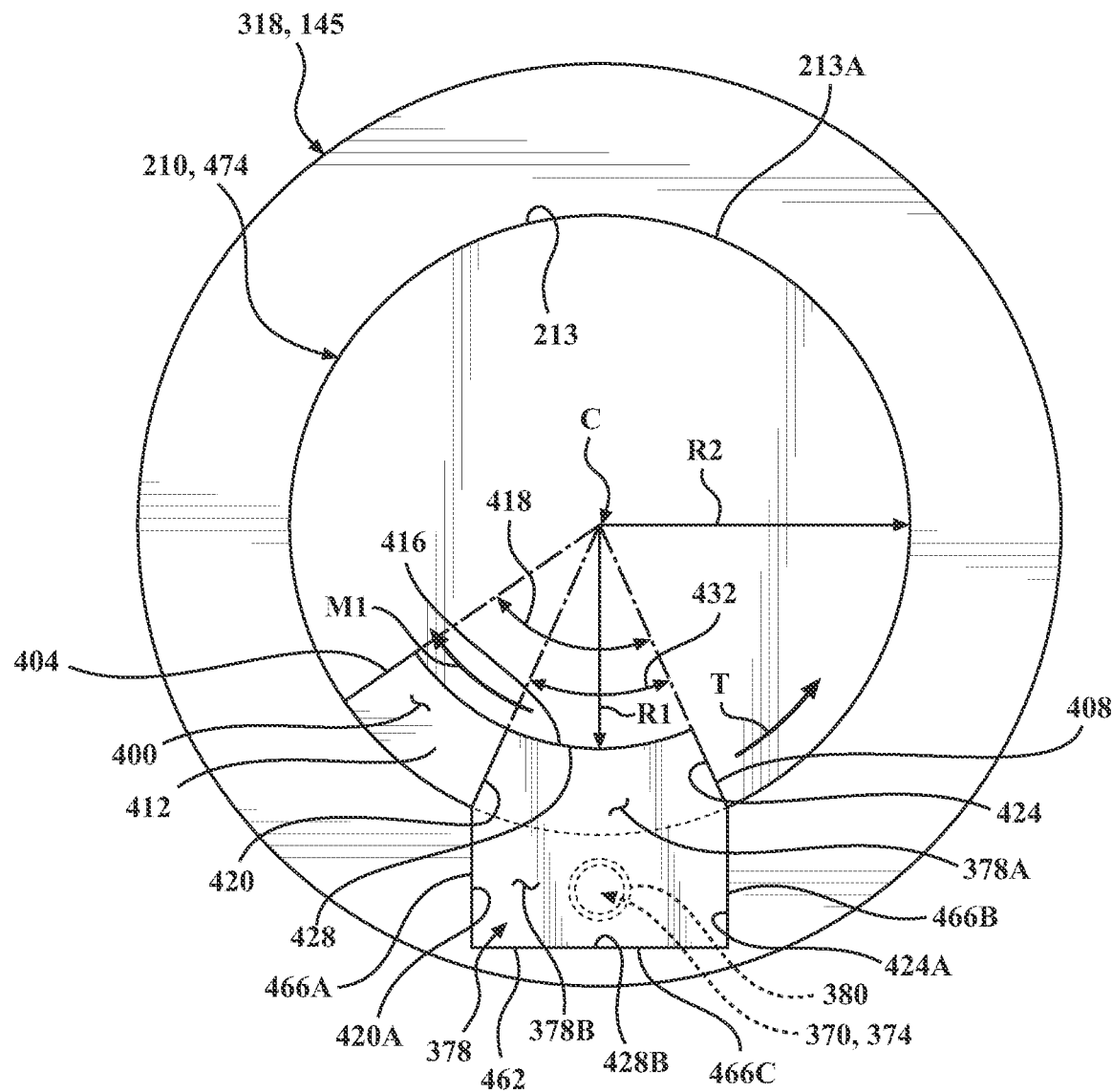
FIG. 14 is a cross-sectional end view taken along section line A-A of FIG. 10, showing the key and the guide pin of FIG. 12 rotated away from the home position.

FIGS. 11 and 12 show an enlarged perspective view and a partial cross-sectional end view taken along section line A-A of FIG. 10, respectively, illustrating additional details of the guide pin 210, the torsion spring 370, the key 378, and the drive gear 145 when the key 378 is in a home rotational position 390. The torsion spring 370 spring-loads, or biases, the key 378 and the guide pin 210 such that the annular sector-shaped portion 378A of the key 378 is urged towards a home rotational position 390 within the annular sector-shaped slot 400 of the guide pin 210. One or both of the key 378 and the guide pin 210 are rotated in response to the torsion spring 370 until the key 378 and the guide pin 210 are positioned in the home rotational position 390 with respect to each other 378, 210. In contrast, FIGS. 13 and 14 show an enlarged perspective view and a partial cross-sectional end view taken along section line A-A of FIG. 10, respectively, illustrating the relative rotational positions of the guide pin 210, the torsion spring 370, the key 378, and the drive gear 145 when the key 378 is spaced apart from the home rotational position 390.

As illustrated in FIGS. 11 and 12, the key 378 comprises a generally annular sector-shaped portion 378A sized and shaped to be insertable into an annular sector-shaped slot 400 in the guide pin 210. The annular sector-shaped slot 400 is adjacent the proximal end 211 of the guide pin 210, as shown in FIG. 11. Referring to FIGS. 11 and 12, the annular sector-shaped slot 400 has opposing end walls 404, 408 extending in a radial direction of the guide pin 210. A slot ledge 412 extends between the opposing end walls 404, 408 with the slot ledge 412 being generally perpendicular to the longitudinal axis 362 of the guide pin 210. An arcuate-shaped wall 416 extends between the opposing end walls 404, 408 with the arcuate-shaped wall 416 having a radius of curvature R1 as measured from the longitudinal axis 362 of the guide pin 210. The arcuate-shaped wall 416 also extends longitudinally away from the slot ledge 412. The annular sector-shaped slot 400 has a general shape of an annular sector defined by the radius of curvature R1 of the arcuate-shaped wall 416, an outer radius of curvature R2 of the guide pin 210, and a first angular distance 418 between the opposing slot end walls 404, 408.

As shown in FIG. 12, the key 378 has a generally annular sector-shaped portion 378A with opposing key end walls 420, 424 sized and shaped to matingly engage with a respective slot end wall 404, 408 when the key 378 is positioned within the slot 400. In the embodiment shown in FIG. 12, the opposing key end walls 420, 424 extend in a radial direction of the guide pin 210. The key 378 includes an arcuate-shaped surface 428 extending between the opposing key end walls 420, 424. The arcuate-shaped surface 428 is sized and shaped to matingly engage with the arcuate-shaped wall 416 of the slot 400. The annular sector-shaped portion 378A of the key 378 has a general shape of an annular sector defined by approximately a radius of curvature R1, an outer radius of curvature R2, and a second angular distance 432 between the opposing key end walls 420, 424 with the second angular distance 432 being less than the first angular distance 418. Thus, the guide pin 210 can be rotated about the longitudinal axis 362 between a first position wherein the key end wall 420 abuts the slot end wall 404 (shown in FIG. 12) and a second position wherein the key end wall 424 abuts the slot end wall 408 (shown in FIGS. 13 and 14). The key 378 extends from the collar 318 of the drive gear 145 into the annular sector-shaped slot 400 in the guide pin 210 and restricts the rotation of the guide pin 210 with respect to the key 378.

Referring to FIG. 12, the key 378 includes a generally rectangular tab portion 378B that extends away from the annular sector-shaped portion 378A. The rectangular tab portion 378B projects away from the guide pin 210 when the key 378 is assembled within the slot 400 of the guide pin 210. The rectangular tab portion 378B comprises opposing end walls 420A, 424A projecting at an angle from a respective end wall 420, 424 of the annular sector-shaped portion 378A. Further, the rectangular tab portion 378B includes a wall 428B extending between the opposing key end walls 420A, 424A as shown in FIG. 12. While a generally rectangular tab portion 378B is shown in the embodiment of FIGS. 11 through 14, it will be appreciated that the tab portion 378B can vary in size and shape without altering the scope of the invention.

The collar 318 includes a notch 462 configured to matingly engage with the rectangular tab portion 378B of the key 378, as shown in FIG. 12. The notch 462 is further defined by opposing notch end walls 466A, 466B and an outer wall 466C extending between the opposing notch end walls 466A, 466B. As shown in FIG. 11, the collar 318 is fixedly coupled to the drive gear 145. Alternatively, the collar 318 can be integrally formed with the drive gear 145. The rectangular tab portion 378B is retained within the notch 462 via a press-fit connection, a mechanical fastener, or the like.

Also shown in FIG. 12, the key 378 includes a hole 380 passing at least partially through the key 378 and configured to matingly engage with the upper end 374 of the torsion spring 370. The upper end 374 and the lower end 382 of the torsion spring 370 fixedly coupled to the key 378 and the guide pin 210, respectively, spring-loads the guide pin 210 and the key 378 towards a home rotational position 390 with the key end wall 420 frictionally engaged with the slot end wall 404, as shown in FIG. 12. The torsion spring 370 keeps the key 378 and the guide pin 210 in this home rotational position 390 when the guide pin 210 is disconnected from the lower gearbox 144B. The torsion spring 370 applies a torque on the guide pin 210 as illustrated by arrow T in FIGS. 12 and 14.

However, the guide pin 210 is free to rotate about its longitudinal axis 362 between the home rotational position 390 (shown in FIGS. 11 and 12) and a second rotational position 474 illustrated in FIGS. 13 and 14. As viewed in FIG. 14, when a torque M1 is applied on the guide pin 210 in a clockwise direction which is greater than the torque T applied by the torsion spring 370 in a counterclockwise direction, the guide pin 210 will rotate in the clockwise direction. The guide pin 210 will rotate in the clockwise direction until the torque M1 on the guide pin 210 is equal and opposite to the torque T applied by the torsion spring 370, or until the slot end wall 408 frictionally engages with the key end wall 424, whichever comes first. The spring-loaded key 378 and the slot 400 in the guide pin 210 allow relative rotation between the guide pin 210 and the upper gearbox 144A, such that the guide pin 210 and the worm 300 can automatically align. The spring-loaded key 378 and slot 400 compensate for certain external driving mechanisms that lack a back-drive feature. Under some circumstances, the guide pin 210 will retain its rotational position and the collar 318 with the key 378 will rotate with respect to the guide pin 210. Thus, the guide pin 210 and the collar 318 with the key 378 can rotate with respect to each other as required to allow the face spline 312 and the meshing spline 316 to align with each other.

Returning to FIGS. 9A through 9C, the spring-loaded key 378 and the slot 400 permit sufficient rotational motion to automatically align the meshing spline 316 of the guide pin 210 with the face spline 312 of the worm 300 when the upper gearbox 144B is assembled to the lower gearbox 144B. Referring to FIG. 9A, when the spaced apart legs 316A-316D of the meshing spline 316 approach the spaced apart legs 312A-312D of the face spline 312, contact by one of the curved surfaces 332 and/or beveled portions 328 of the meshing spline 316 with the curved surfaces 358 and/or with the beveled portions 354 of the face spline 312 will apply torque to the meshing spline 316 and cause the guide pin 210 to rotate towards a gap 312E between the adjacent legs 312A-312D of the face spline 312. Further, in certain embodiments, the applied torque on the face spline 312 by the beveled portions 328 of the meshing spline 316 can result in the face spline 312 rotating to automatically align the face spline 312 with the meshing spline 316.

FIG. 9B illustrates the meshing spline 316 being automatically aligned with the face spline 312 such that the spaced apart legs 316A-316D of the meshing spline 316 are partially inserted into the gaps 312E between adjacent legs 312A-312D of the face spline 312. FIG. 9C shows the face spline 312 of the worm 300 matingly engaged with the meshing spline 316 on the guide pin 210. The auto-centering quick connection mechanism 147, comprising the face spline 312 on the worm 300 and the meshing spline 316 on the guide pin 210 in combination with the spring-loaded key 378, helps to automatically rotate the guide pin 210 when the upper gearbox 144A is engaging the lower gearbox 144B to deliver torque to the lower gearbox 144B. In the embodiment shown in the Figures, the upper gearbox 144A is operatively coupled to the guide pin 210 through a drive gear 145 in the upper gearbox 144A. However, the components of the upper and lower gearboxes 144A, 144B can vary without altering the scope of the invention.

Once the face spline 312 and the meshing spline 316 are fully engaged, as shown in FIG. 9C and FIG. 10, rotation of the drive gear 145 by a motor (not shown) within the vehicle seat 18 results in rotation of the worm 300 and the operatively coupled drive wheel 146.

Therefore, the auto-centering quick connection mechanism 147 provides a meshed connection between the drive gear 145 and the drive wheel 146 to transfer rotation of the drive gear 145 to the drive wheel 146 to provide power sliding movement of the power rail drive assembly 12 along the fixed long rail 14 while also allowing removable coupling of the vehicle seat 18 to the power rail drive assembly 12.

One benefit of an auto-centering quick connection mechanism 147 for a long rail assembly 10 is a drive wheel 146 is included within a fixed long rail 14 for repositioning a vehicle seat 18 along the fixed long rail 14 while the vehicle seat 18 includes a drive gear 145 configured to provide torque to the drive wheel 146. A second benefit is the drive gear 145 can be operatively coupled to a motor located within the vehicle seat 18. A third benefit is the quick connection mechanism 147 automatically centers and engages a meshing spline 316 extending from the drive gear 145 with a face spline 312 operatively coupled with the drive wheel 146. A fourth benefit is the quick connection mechanism 147 automatically repositions the guide pin 210 in a home rotational position 390 when the drive gear 145 is operatively decoupled from the drive wheel 146.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A long rail assembly for providing sliding movement of a vehicle seat within a vehicle, said long rail assembly comprising:

a fixed long rail extending longitudinally between opposing first and second ends of said fixed long rail and defining an interior cavity therebetween;

a rail drive assembly extending longitudinally between opposing first and second ends of said rail drive assembly defining an interior cavity therebetween, said rail drive assembly slidably coupled to said fixed long rail for providing said sliding movement of said vehicle seat along said fixed long rail;

a drive wheel rotatably coupled within said interior cavity of said fixed long rail;

an upper gearbox adapted to be attached to said vehicle seat and configured to be operatively coupled to said drive wheel for automatically driving said rail drive assembly longitudinally along said fixed long rail; and an auto-centering quick connection mechanism configured to operatively couple said upper gearbox and said drive wheel when said vehicle seat is coupled with said rail drive assembly.

2. The long rail assembly of claim 1, wherein said upper gearbox includes a drive gear, a guide pin rotationally coupled to said drive gear, and a key extending between said drive gear and said guide pin restricting rotation of said guide pin.

3. The long rail assembly of claim 2, wherein said drive gear includes a central bore aligned on a rotational axis of said drive gear, a collar extending around an outer periphery of said central bore, and a notch in said collar configured to matingly engage with a tab portion of said key.

4. The long rail assembly of claim 3, wherein said guide pin has an upper end configured to matingly engage with said central bore of said drive gear, a lower end having a meshing spline, and an annular sector-shaped slot extending around a portion of an outer periphery of said guide pin near said upper end.

5. The long rail assembly as set forth in claim 4, wherein:
said key having an annular sector-shaped portion and said tab portion projecting from said annular sector-shaped portion;
said annular sector-shaped portion of said key being sized and shaped to be insertable into said annular sector-shaped slot in said guide pin; and
at least a portion of said tab portion being sized and shaped to fit within said notch in said collar.

6. The long rail assembly as set forth in claim 5, wherein:
said annular sector-shaped slot of said guide pin has opposing slot end walls extending in a radial direction of said guide pin; and
said opposing slot end walls being spaced apart by a first angular distance.

7. The long rail assembly as set forth in claim 6, wherein:
said annular sector-shaped portion of said key having opposing key end walls extending in said radial direction of said guide pin when said key is assembled with said guide pin;
said opposing key end walls being spaced apart by a second angular distance; and
said second angular distance being less than said first angular distance.

8. The long rail assembly as set forth in claim 7, wherein:
said upper gearbox including a torsion spring having a first spring end fixedly coupled to said key and a second spring end fixedly coupled to said guide pin; and
said torsion spring spring-loading said key and said guide pin such that said annular sector-shaped portion of said key is positioned in a home rotational position within said annular sector-shaped slot of said guide pin when said upper gearbox is decoupled from said drive wheel.

9. The long rail assembly as set forth in claim 8, wherein:
said drive wheel is operatively coupled to a worm;
said worm having a rotational axis aligned with a longitudinal axis of said guide pin when said drive gear is operatively coupled to said drive wheel; and
said worm including a face spline sized and shaped to meshingly engage with said meshing spline of said guide pin.

10. The long rail assembly as set forth in claim 9, wherein:
said meshing spline comprises a first plurality of spaced apart legs projecting in a longitudinal direction from said guide pin;
each leg of said meshing spline having opposing side portions extending from said guide pin, a leg distal end, and a tip portion near said leg distal end; and
said tip portion of each leg of said meshing spline having opposing beveled portions extending from said opposing side portions towards said leg distal end.

11. The long rail assembly as set forth in claim 10, wherein:
said face spline comprises a second plurality of spaced apart legs projecting in a longitudinal direction from said worm;
each leg of said face spline having opposing side portions extending from said worm, a leg distal end, and a tip portion near said leg distal end; and
said tip portion of each leg of said face spline having opposing beveled portions extending from said opposing side portions towards said leg distal end.

12. The long rail assembly as set forth in claim 11, wherein:
said auto-centering quick connection mechanism comprises said meshing spline extending from said guide pin having said first plurality of spaced apart legs with each leg of said meshing spline having said tip portions with said opposing beveled portions, said face spline extending from said worm and having said second plurality of spaced apart legs with each leg of said face spline having said tip portions with said opposing beveled portions, said key having said annular sector-shaped portion with said second angular distance between said opposing key end walls, said torsion spring operatively coupled between said key and said guide pin spring-loading said key and said guide pin towards a home rotational position, and said annular sector-shaped slot of said guide pin having said first angular distance between said opposing slot end walls greater than said second angular distance.

13. The long rail assembly as set forth in claim 12, wherein:
said auto-centering quick connection mechanism rotates said guide pin by torque applied to said guide pin by at least one of said opposing beveled portions of said meshing spline contacting at least one of said opposing beveled portions of said face spline until said tip portions of said meshing spline enter a respective gap between adjacent legs of said face spline.

14. The long rail assembly as set forth in claim 13, wherein said guide pin of said auto-centering quick connection mechanism rotates with respect to said key when said torque applied to said opposing beveled portions of said legs is greater and opposed to spring force applied by said torsion spring.

15. The long rail assembly as set forth in claim 14, wherein said opposing beveled portions of each of said tip portions of each leg of said meshing spline and said face spline are tapered from an adjacent side portion towards a longitudinal axis of said respective leg.

16. The long rail assembly as set forth in claim 15, wherein said auto-centering quick connection mechanism automatically rotates said guide pin towards said home rotational position when said guide pin is decoupled from said face spline.

17. The long rail assembly as set forth in claim 16, wherein one or both of said key and said guide pin are rotated in response to said spring force applied by said torsion spring until said key and said guide pin are positioned in said home rotational position with respect to each other when said face spline is spaced apart from said meshing spline.

\* \* \* \* \*